United States Patent
Smith

[19]

[11] Patent Number: 6,058,703
[45] Date of Patent: May 9, 2000

[54] FLUID VALVE TRANSMISSION

[76] Inventor: Richard Smith, Box 350, Stratford, Iowa 50249

[21] Appl. No.: 09/161,574

[22] Filed: Sep. 28, 1998

[51] Int. Cl.$^7$ .................................................. F16D 31/02
[52] U.S. Cl. .......................... 60/449; 60/489; 137/625.23
[58] Field of Search ................ 60/489, 493; 137/625.23, 137/625.24

[56] References Cited

U.S. PATENT DOCUMENTS

| | | | |
|---|---|---|---|
| 1,042,634 | 10/1912 | Wood | 137/625.23 |
| 1,107,675 | 8/1914 | Lentz | 60/493 |
| 1,126,812 | 2/1915 | Mcqueen | 60/485 |
| 1,292,091 | 1/1919 | Schirmer | 60/493 |
| 1,360,784 | 11/1920 | Ogden et al. | 137/625.24 |
| 2,182,459 | 12/1939 | Vickers | 137/625.23 |
| 2,333,620 | 11/1943 | Tripp et al. | 60/493 |
| 2,362,389 | 11/1944 | Martin | 60/493 |
| 2,749,941 | 6/1956 | Gardner | 137/625.23 |
| 3,363,651 | 1/1968 | Boyd | 137/625.23 |
| 3,504,703 | 4/1970 | Bozoyan | 137/625.23 |
| 3,815,632 | 6/1974 | Bliss | 137/625.24 |
| 3,918,494 | 11/1975 | Dalton | 137/625.23 |
| 4,055,232 | 10/1977 | Moore | 180/132 |
| 4,465,099 | 8/1984 | Kervagoret | 137/625.23 |
| 4,471,808 | 9/1984 | Thomsen et al. | 137/625.32 |
| 4,475,572 | 10/1984 | Brausfeld | 137/625.23 |
| 4,802,508 | 2/1989 | Styles et al. | . |
| 4,981,159 | 1/1991 | Christensen | . |
| 4,984,486 | 1/1991 | Takada | . |
| 4,984,603 | 1/1991 | Karakama | . |
| 4,986,072 | 1/1991 | Kubomoto | . |
| 4,986,307 | 1/1991 | Hardee | . |
| 4,988,967 | 1/1991 | Miller | . |
| 5,010,924 | 4/1991 | Jenn | . |
| 5,375,622 | 12/1994 | Houston | . |

Primary Examiner—John E. Ryznic
Attorney, Agent, or Firm—Henderson & Sturm LLP

[57] ABSTRACT

A fluid valve transmission having an automatic by-pass in neutral on the pump side and automatic brake or by-pass on the driven motor side while in the neutral position. Through holes and channels in the rotor are designed with close openings to open and close smoothly as the valve is turned, one opening as the other closes. All channels in the rotor are full of fluid at all times. The valve positions are designed with neutral midway between forward and reverse. This allows for quick start and stop and forward or reverse changes. Pressure equalization lines in the valve body from the pump and motor lines enter a circumferential channel on the rotor valve. This prevents the rotor from binding in high pressure applications.

13 Claims, 5 Drawing Sheets

LAYOUT OF CORE (ROTOR) CHANNELS

LAYOUT OF CORE (ROTOR) CHANNELS

FLUID VALVE TRANSMISSION

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of fluid valve transmissions, and more particularly to a rotary fluid valve transmission.

2. Description of Related Art

As can be seen by reference to the following U.S. Pat. Nos. 4,986,307; 4,475,572; 4,802,508; 5,375,622; 5,010,924; 4,988,967; 4,986,072; 4,984,603; 4,981,159; and 4,984,486 the prior art is replete with myriad and diverse fluid valves and transmissions.

While all of the aforementioned prior art constructions are more than adequate for the basic purpose and function for which they have been specifically designed, they are uniformly deficient with respect to their failure to provide a simple, efficient, and practical fluid valve transmission.

As a consequence of the foregoing situation, there has existed a longstanding need for a new and improved fluid valve transmission and the provision of such a construction is a stated objective of the present invention.

BRIEF SUMMARY OF THE INVENTION

Briefly stated, the present invention provides a fluid valve transmission having an automatic by-pass in neutral on the pump side and automatic brake or by-pass on the driven motor side while in the neutral position. Through holes and channels in the rotor are designed with close openings to open and close smoothly as the valve is turned, one opening as the other closes. All channels in the rotor are full of fluid at all times. The valve positions are designed with neutral midway between forward and reverse. This allows for quick start and stop and forward or reverse changes. Pressure equalization lines in the valve body from the pump and motor lines enter a circumferential channel on the rotor valve. This prevents the rotor from binding in high pressure applications.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
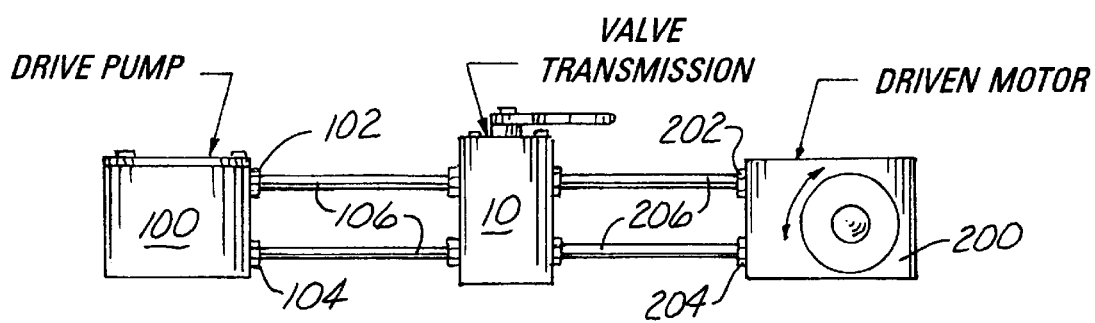
FIG. 1 is a schematic view illustrating the fluid valve transmission of the present invention interconnecting a fluid drive pump and a driven motor.

As can be seen by reference to the drawings, and in particularly to FIG. 1, the fluid valve transmission that forms the basis of the present invention is designated generally by the reference number 10. The transmission 10 interconnects a fluid drive pump 100 and a driven motor 200. The pump 100 includes a fluid feed port 102 and a fluid return port 104 connected by conduit 106 to one side of the transmission 10. The driven motor 200 includes a first fluid port 202 and a second fluid port 204 connected by conduit 206 to the other side of the transmission 10.

Figure 2:
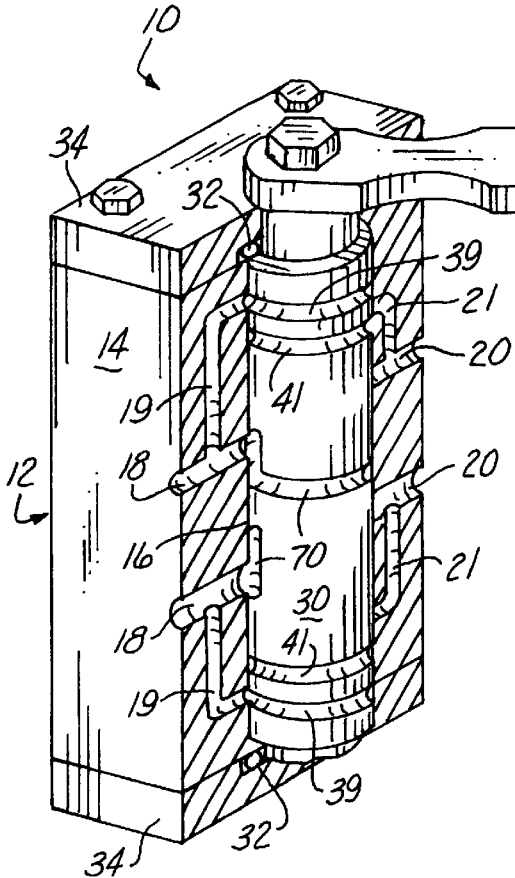
FIG. 2 is a cut away perspective view of the valve transmission illustrating the fluid communication of the fluid lines formed in the valve body with the fluid channels formed in the rotor.
Figure 3:
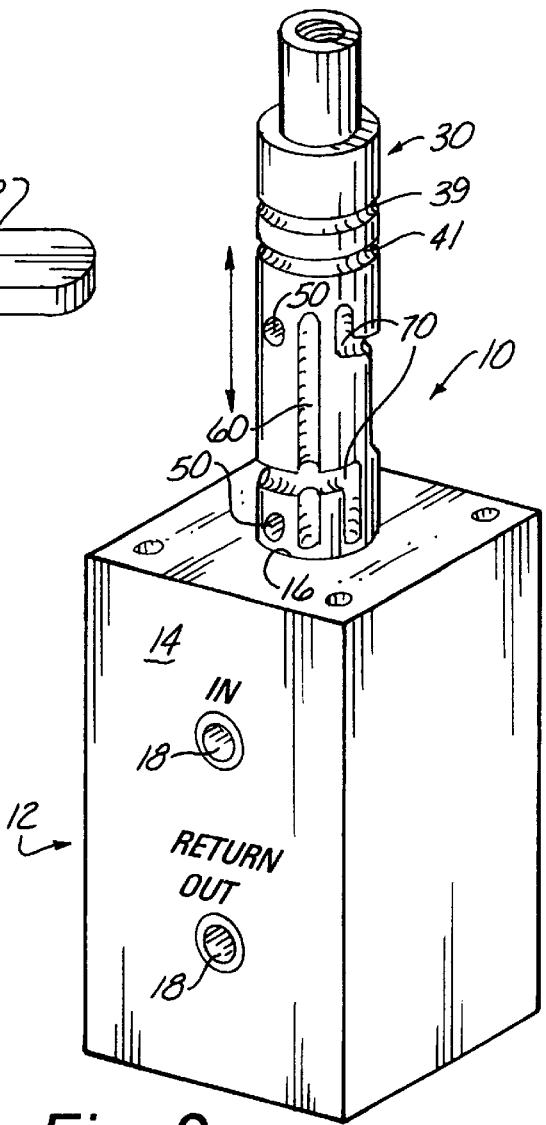
FIG. 3 is an exploded perspective view illustrating the rotor being inserted into the valve body.

As best illustrated in FIGS. 2 and 3, the transmission 10 includes a body 12 having an outer sidewall 14 and a bored central chamber 16. Pump lines 18 and drive motor lines 20 are formed in the body 12 and communicate between the sidewall 14 and the central chamber 16. Pump pressure equalization lines 19 formed in the body 12 communicate between the pump lines 18 and the chamber 16, and motor pressure equalization lines 21 communicate between the motor lines 18 and the chamber 16.

A rotor 30 is rotatably supported in the central chamber 16 by bearings 32 carried in the end plates 34. An operator handle 36 is attached to one end of the rotor 30 and acts to move the rotor between forward, neutral, and reverse positions. The rotor 30 has circumferential pump pressure equalization channels 39 and motor pressure equalization channels 41 positioned on the rotor 30 in registry with the pump pressure lines 19 and motor pressure lines 21, respectively.

Figure 4:
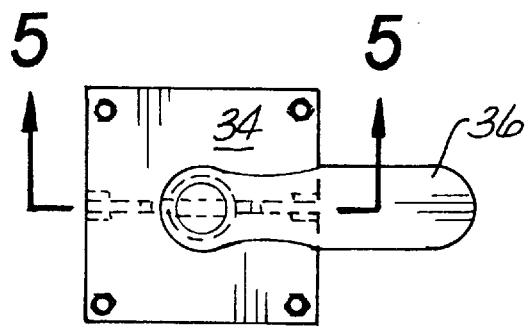
FIG. 4 is a top plan view of the fluid valve transmission with the rotor operator in the forward position.
Figure 5:
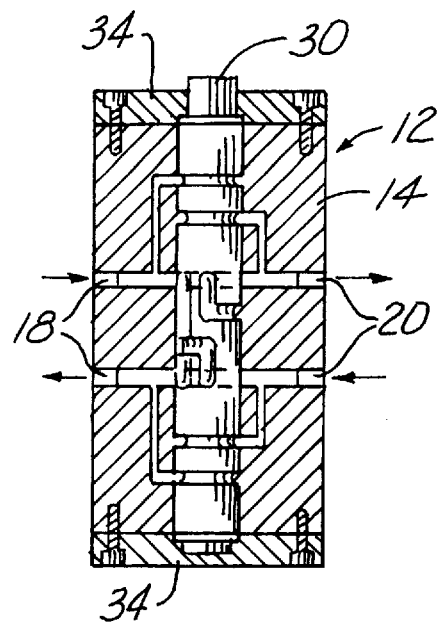
FIG. 5 is a sectional view taken along line 5—5 of FIG. 4.
Figure 6:
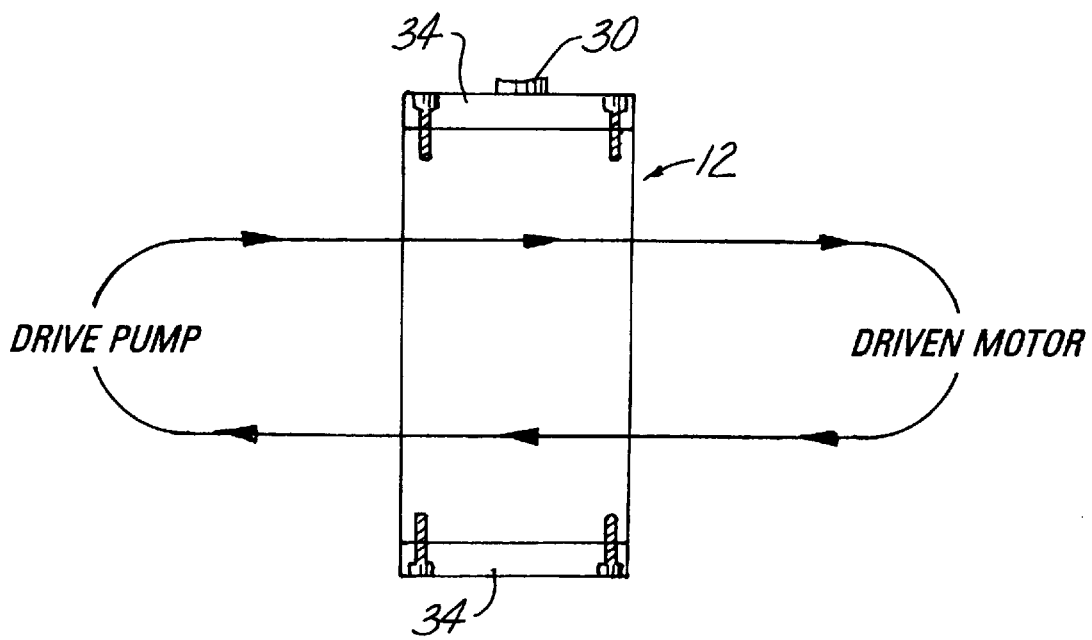
FIG. 6 is a schematic view illustrating the fluid flow in the forward position.
Figure 7:
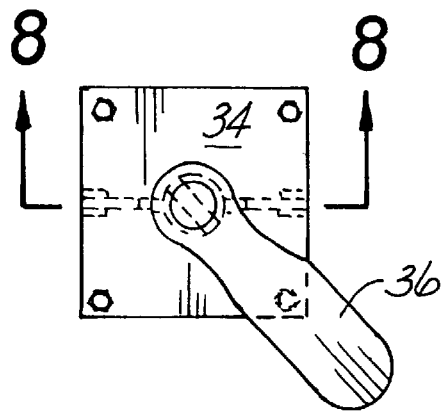
FIG. 7 is a top plan view showing the rotor operator in the neutral position.
Figure 8:
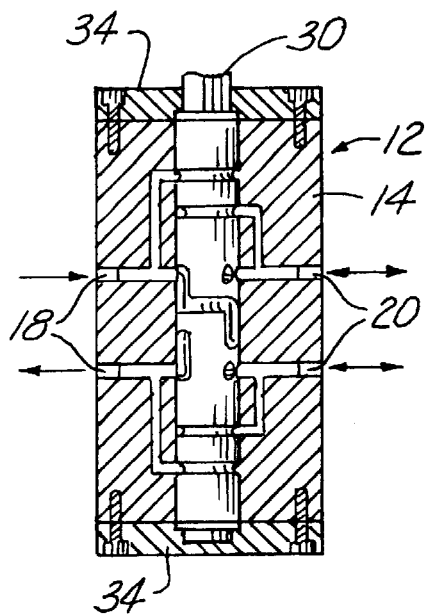
FIG. 8 is a sectional view taken along line 8—8 of FIG. 7.
Figure 9:
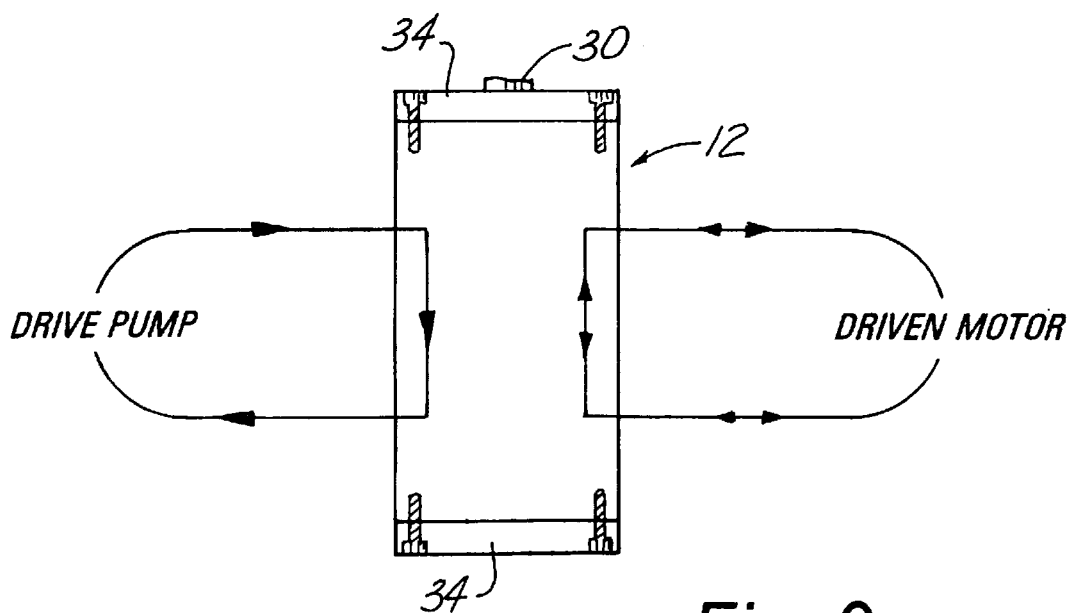
FIG. 9 is a schematic view illustrating the fluid flow with the pump in the neutral position and the driven motor in the brake position.
Figure 10:
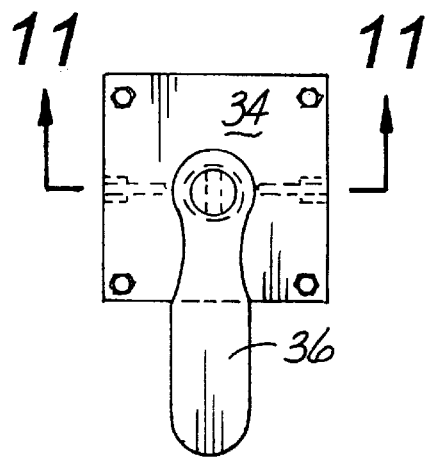
FIG. 10 is a top plan view showing the rotor operator in the reverse position.
Figure 11:
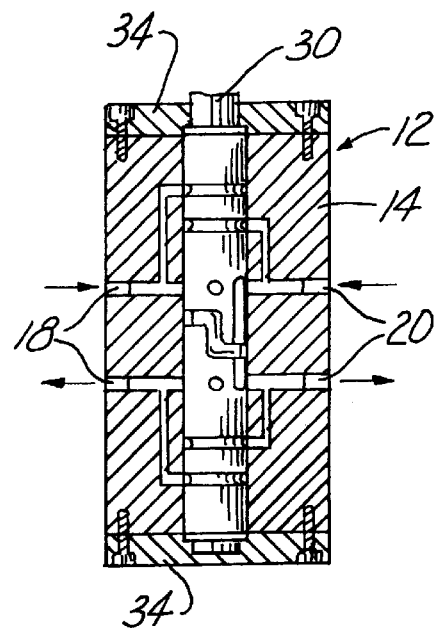
FIG. 11 is a sectional view taken along line 11—11 of FIG. 10.
Figure 12:
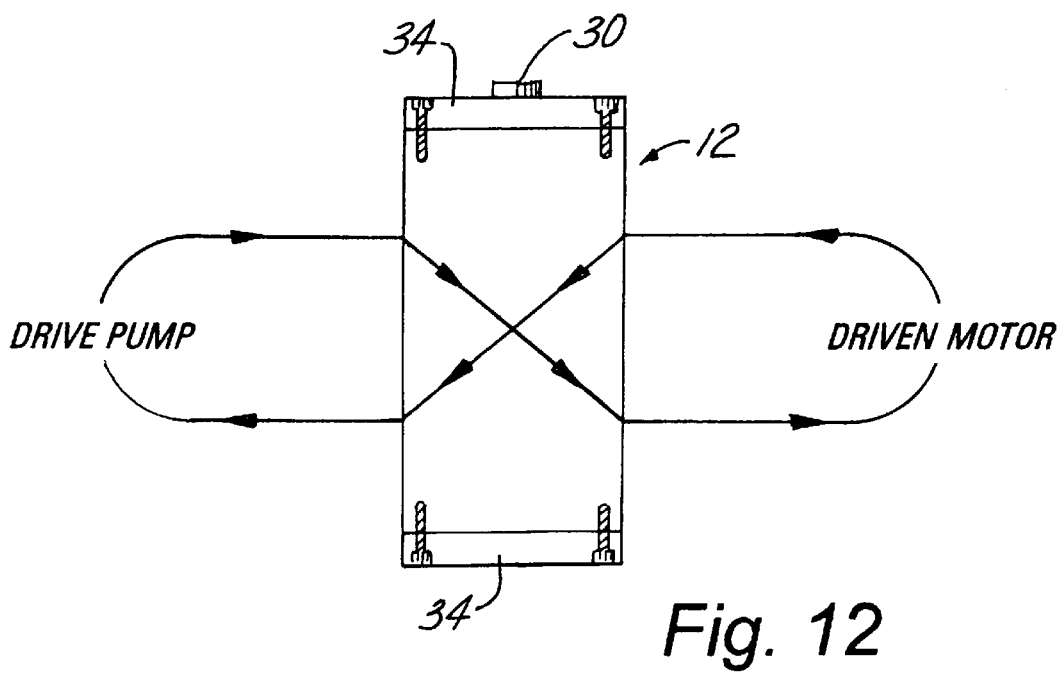
FIG. 12 is a schematic view illustrating the fluid flow in the reverse position.
Figure 13:
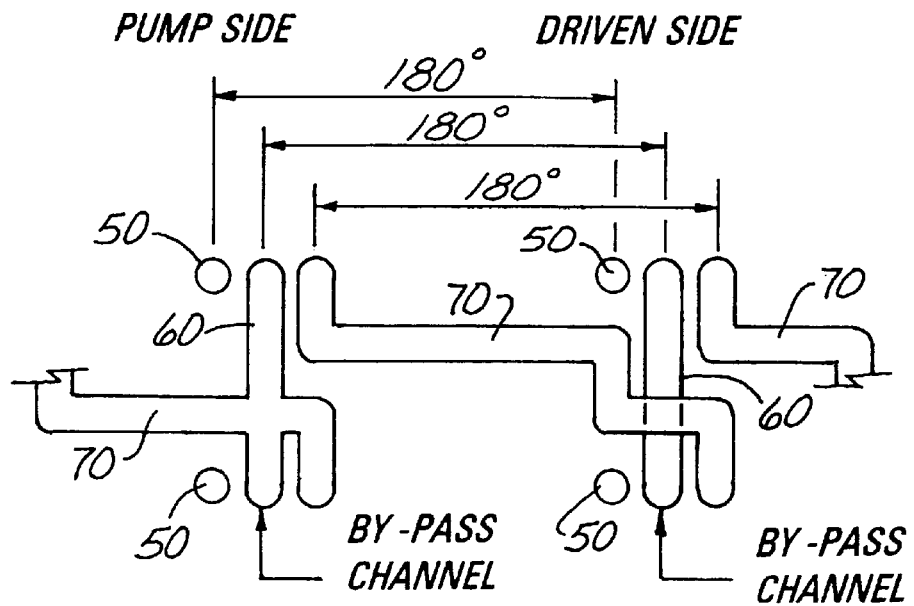
FIG. 13 is a layout of the rotor channels in an embodiment having a neutral position for the pump and a free movement by-pass position for the driven motor.
Figure 14:
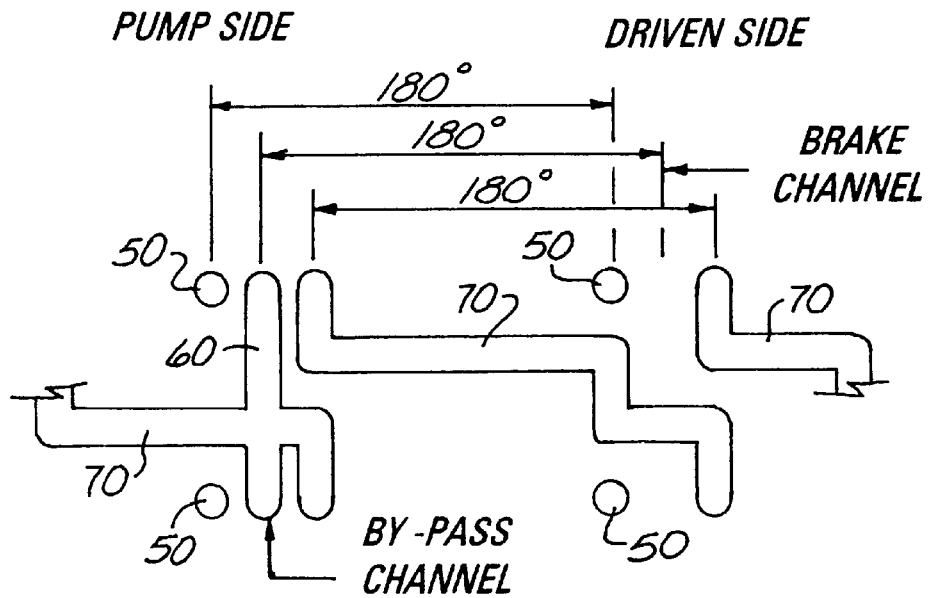
FIG. 14 is a layout of the rotor channels in an embodiment having a neutral position for the pump and a brake position for the driven motor.

As best shown by reference to FIGS. 3 and 13, the rotor 30 also carries three adjacent channels 50, 60, and 70 all having widths greater than the radial spacing interval between channels. Channel 50 is a pair of openings formed through the body of the rotor 30, channel 60 is a pair of axially directed grooves formed in the outer surface of the rotor 30, and channel 70 is a pair of axially and radially directed grooves formed in the outer surface. When the rotor 30 is positioned so that channel 50 is in communication with the pump lines 18 and motor lines 20, the fluid from the pump 100 drives the motor 200 in a forward direction as shown in FIGS. 4–6. When the rotor 30 is positioned so that channel 60 communicates with lines 18 and 20, the pump 100 is in neutral and the motor 200 is allowed free movement as shown in FIGS. 7–9. Finally, when the rotor 30 is positioned so that channel 70 communicates with lines 18 and 20, the pump 100 drives the motor 20 in a reverse direction as illustrated in FIGS. 10–12. Since the radial spacing between channels 50, 60, and 70 is less than the width of these channels the transition between the neutral position and the forward and reverse positions is very smooth.

FIG. 13 illustrates an alternate embodiment of the transmission 10 wherein the channel 60 is a single axially directed groove that is positioned to communicate with the pump lines 18, while the rotor surface radially spaced 180° from the single groove acts as a brake since it blocks fluid flow to or from the motor 200.

The fluid transmission 10 can be of any size or material to suit the need. It can be used as a forward-stop-reverse on a tool or a control for direction and speed using a one speed power source as in an electric motor. Also, the valve transmission 10 can operate as a one-way valve or two-way valve depending on need. The valve can be made to take advantage of simple channel design changes to be multiple speed or power when used with more than one power source. Further, the valve transmission 10 can be used to operate any number of hydraulic or pneumatic valves and can be used on anything driven by a motor or a cylinder. One valve transmission 10 on each side of a wheeled vehicle could steer, control speed and direction, stop, bypass or brake. On two-wheeled vehicles, steering can be done directly with two valve transmissions 10 and a floating wheel as on wheelchairs, lawnmowers and tracked vehicles, or with one valve transmission and a choker valve or valves built into steering. On four wheeled vehicles steering can be done with two valve transmissions 10, one on each side, plus a choker valve built into the steering, or one valve transmission 10 with a choker valve or valves.

Advantages of the fluid valve transmission 10 used in conjunction with other components include zero turning capability; very smooth operation; all purpose uses; automatic pump bypass; automatic brake or bypass on driven motor side; multiple speeds can be added; the driven motor can run at a set speed for power driven parts, like mower blades, while ground speed is maintained separately; and other parts such as brakes, drive shafts, power steering mechanisms, shift levers, and differential seals can be eliminated.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. A fluid valve transmission, comprising:
   a fluid drive pump including a fluid feed port and a fluid return port;
   a fluid valve transmission operably interconnecting the drive pump and the driven motor, and including a body having a sidewall, a central chamber, and pump lines and motor lines communicating between the sidewall and central chamber, the pump lines being attached to and in communication with the pump feed and return ports and the motor lines being attached to and in communication with the motor first and second fluid ports;
   the transmission further including a rotor rotatably supported in the central chamber and being selectively movable between a forward, a neutral and a reverse position, the rotor including a plurality of adjacent channels disposed in predetermined spaced intervals around the rotor, each channel having a width greater than the predetermined radial spacing interval;
   wherein a first pair of the plurality of channels includes a pair of openings formed through the body of the rotor which simultaneously connects the pump feed port to the first motor port, and connects the second motor port to the pump return port, wherein fluid from the pump drives the motor in a first forward direction;
   wherein another of the plurality of channels includes a vertical groove which simultaneously connects the pump feed port to the pump return port, and prevents fluid flow through the first and second motor ports, wherein the motor is prevented from movement; and
   wherein a second pair of the plurality of channels includes a pair of axially and radially directed grooves which simultaneously connects the pump feed port to the second motor port, and connects the first motor port to the pump return port, wherein fluid from the pump drives the motor in a second reverse direction.

2. The fluid valve transmission of claim 1, further including pump pressure equalization lines formed in the valve body communicating between the pump lines and pump pressure equalization channels formed around the rotor.

3. The fluid valve transmission of claim 1, further including motor pressure equalization lines formed in the valve body communicating between the motor lines and motor pressure equalization channels formed around the rotor.

4. The fluid valve transmission of claim 2, further including motor pressure equalization lines formed in the valve body communicating between the motor lines and motor pressure equalization channels formed around the rotor.

5. The fluid transmission as in claim 1 wherein the plurality of channels further comprises yet another vertical groove which connects the first and second motor ports wherein the motor is allowed free movement.

6. A fluid valve transmission, comprising:
   a fluid drive pump including a fluid feed port and a fluid return port;
   a fluid driven motor including a first fluid port an da second fluid port;
   a fluid valve transmission operably interconnecting the drive pump and the driven motor, and including a body having a sidewall, a central chamber, a pump lines and motor lines communicating between the sidewall and central chamber, the pump lines being attached to and in communication with the pump feed and return ports and the motor lines being attached to and in communication with the motor first and second fluid ports;
   the transmission further including a rotor rotatably supported in the central chamber and being selectively movable between a forward, a neutral and a reverse position, the rotor including three pairs of adjacent channels disposed in predetermined spaced intervals around the rotor;
   wherein a first pair of the three pairs of channels includes a pair of openings formed through the body of the rotor which simultaneously connects the pump feed port to the first motor port, and connects the second motor port to the pump return port, wherein fluid from the pump drives the motor in a first forward direction;

wherein a second pr of the three pairs of channels includes a pair of vertical grooves which simultaneously connects the pump feed port to the pump return port, and connects the first and second motor ports wherein the motor is allowed free movement;

wherein a third pair of the three pairs of channels includes a pair of axially and radially directed grooves which simultaneously connects the pump feed port to the second motor port, and connects the first motor port to the pump return port, wherein fluid from the pump drives the motor in a second reverse direction; and pump pressure equalization lines formed in the valve body communicating between the pump lines and pump pressure equalization channels formed around the rotor.

7. The fluid valve transmission of claim 6, further including motor pressure equalization lines formed in the valve body communicating between the motor lines and motor pressure equalization channels formed around the rotor.

8. The fluid valve transmission of claim 6, wherein each of the three adjacent channels has a width greater than the predetermined radial spacing interval.

9. The fluid valve transmission of claim 7, wherein each of the three adjacent channels has a width greater than the predetermined radial spacing interval.

10. A fluid valve transmission, comprising:
- a fluid drive pump including a fluid feed port and a fluid return port;
- a fluid driven motor including a first fluid port and a second fluid port;
- a fluid valve transmission operably interconnecting the drive pump and the driven motor, and including a body having a sidewall, a central chamber, and pump lines and motor lines communicating between the sidewall and central chamber, the pump lines being attached to and in communication with the pump feed and returns ports and the motor lines being attached to and in communication with the motor first and second fluid ports;

the transmission further including a rotor rotatably supported in the central chamber and being selectively movable between a forward, a neutral and a reverse position, the rotor including three adjacent channels disposed in predetermined spaced intervals around the rotor;

wherein a first of the three channels includes a pair of openings formed through the body of the rotor which simultaneously connects the pump feed port to the first motor port, and connects the second motor port to the pump return port, wherein fluid from the pump drives the motor in a first forward direction;

wherein a second of the three channels includes a pair of vertical grooves simultaneously connects the pump feed port to the pump return port, and either connects the first and second motor ports or prevents fluid flow through the first and second motor ports, wherein the motor is respectively allowed free movement or is prevented from movement;

wherein a third of the three channels includes a pair of axially and radially directed grooves which simultaneously connects the pump feed port to the second motor port, and connects the first motor port to the pump return port, wherein fluid from the pump drives the motor in a second reverse direction; and motor pressure equalization lines formed in the valve body communicating between the motor lines and motor pressure equalization channels formed around the rotor.

11. The fluid valve transmission of claim 10, further including pump pressure equalization lines formed in the valve body communicating between the pump lines and pump pressure equalization channels formed around the rotor.

12. The fluid valve transmission of claim 10, wherein each of the three adjacent channels has a width greater than the predetermined radial spacing interval.

13. The fluid valve transmission of claim 11, wherein each of the three adjacent channels has a width greater than the predetermined radial spacing interval.

* * * * *